United States Patent [19]

Lee

[11] Patent Number: 5,702,064
[45] Date of Patent: Dec. 30, 1997

[54] CASSETTE HOUSING ASSEMBLY OF A TAPE RECORDER HAVING A PHASE DIFFERENCE CORRECTOR

[75] Inventor: Jong-Chan Lee, Suwon, Rep. of Korea

[73] Assignee: Samsung Electronics Co., Ltd., Kyungki-do, Rep. of Korea

[21] Appl. No.: 654,896

[22] Filed: May 29, 1996

[30] Foreign Application Priority Data

Sep. 12, 1995 [KR] Rep. of Korea .................. 95-29693

[51] Int. Cl.⁶ .................................................. G11B 23/04
[52] U.S. Cl. ................................ 242/338.4; 360/96.6
[58] Field of Search ............................ 242/338.4, 342, 242/340, 338; 360/96.5, 96.6

[56] References Cited

U.S. PATENT DOCUMENTS

| | | | |
|---|---|---|---|
| 4,583,138 | 4/1986 | Imazaike | 360/96.5 X |
| 4,757,400 | 7/1988 | Park | 360/96.5 |
| 4,785,364 | 11/1988 | Ando et al. | 360/96.5 |
| 4,808,011 | 2/1989 | Aarts et al. | 360/96.5 X |
| 5,050,022 | 9/1991 | Aizawa | 360/96.5 |
| 5,390,055 | 2/1995 | Maehara et al. | 360/96.5 X |
| 5,481,419 | 1/1996 | Fujishiro | 360/96.5 |

*Primary Examiner*—Daniel P. Stodola
*Assistant Examiner*—William A. Rivera
*Attorney, Agent, or Firm*—Sughrue, Mion, Zinn, Macpeak & Seas, PLLC

[57] ABSTRACT

A housing assembly for a tape cassette loading device, is equipped with gear members having different radii on the right and left sides of the housing to compensate for uneven loading forces applied to the housing.

5 Claims, 3 Drawing Sheets

$R_2 = R_4$
$R_1 = R_3$ $R_2 = R_4$
$R_1 = R_3$ $L_2 < L_4$
$L_1 > L_3$ $L_2 < L_4$
$L_1 > L_3$

CASSETTE HOUSING ASSEMBLY OF A TAPE RECORDER HAVING A PHASE DIFFERENCE CORRECTOR

BACKGROUND OF THE INVENTION

1. Field of the Invention

The present invention relates to a cassette housing assembly of a tape recorder, and more particularly, to a cassette housing assembly of a tape recorder in which both sides of a housing rotate at an equivalent rotating angle when the housing rotates which respect to a deck in order to load a tape cassette onto a reel of the deck.

2. Description of the Related Art

Conventionally a top loading device for loading a tape cassette downward has been used for a tape recorder such as a camcorder, as shown in FIG. 1.

In the top loading method, a tape housing assembly 100 equipped with a housing 80 for receiving a cassette 200 is rotatably attached to chassis members 20 and 21 provided on either side of a deck member 10. A head drum 11 and reel tables 12 and 13 are mounted on deck member 10. A housing locking device (not shown) is installed on one side of the housing assembly 100. The housing locking device serves to push the housing 80 down to a loaded position and retain the housing 80 in the loaded position in a known manner. For a smooth "one-touch" operation of securing the housing 80 once the tape is inserted, only one side of the housing 80 (i.e., that side at which the locking device is installed) is pressed to lower and lock the housing 80.

The housing assembly 100 is further equipped with a supporting means for supporting the housing 80 during operation. This supporting means includes first and second arm members 30 and 40 rotating on a pin 35 and third and fourth arm members 50 and 60 rotating on a pin 55. Each pair of arm members is coupled to one side of the housing 80 in a scissors-like configuration via spring members 45 and 65, respectively, which bias the housing 80 into a raised (open) state.

Further, the second and fourth arm members 40 and 60 have respective guide slots 41 & 42 and 61 & 62 formed on both ends thereof. The guide slots 42 and 62 are slidably coupled on both sides of the housing 80 and the guide slots 41 and 61 are combined with guide pins 22 and 23 formed on the chassis 20 and 21, respectively. Coupling pins 34 and 54 are formed on each end of the first and third arm members 30 and 50 and are rotatably inserted into coupling holes 20' and 21' formed on the chassis 20 and 21, respectively.

A shaft 70 is installed across both sides of the housing 80 in the inner end thereof. First and second gears 71 and 72 are combined with both ends of the shaft 70. First and second sector gears 31 and 51 are respectively engaged with the first and second gears 71 and 72 and are installed on each end of the first and third arm members 30 and 50.

Also, a locking pin 81 is formed on one side of the housing 80. As illustrated in FIG. 2A and 2B, the radii of the first and second gears 71 and 72 are equivalent and the radii of the first and second sector gears 31 and 51 are the same as each other.

After putting the tape cassette 200 into the housing 80 of the housing assembly 100 having the above configuration, a specified point on the outer surface of the housing 80, corresponding to the locking pin 81, is pressed by the housing locking device and the locking pin 81 is locked by being engaged with the locking device and, concurrently, the tape cassette 200 is loaded on the reel tables 12 and 13.

However, when the tape cassette 200 is loaded on the reel tables 12 in the manner described above, the pressure exerted on only one side of the housing 80, i.e., the locking pin 81, makes the right or left side thereof incline. Accordingly, the tape cassette 200 is not loaded evenly on each reel table 12 and 13. That is, one side of the tape cassette 200 is not in close contact with the reel table. This phenomenon is also due to a fact that the third and fourth arm members 50 and 60 that are remote from the locking pin 81 are moved upward a small amount by a restoring force of the spring member 65.

To solve this problem, the left and right sides of the conventional housing 80 have been modified and assembled. Specifically, both sides of the housing 80 are assembled to have an interlocking location, of the first gear 71 and the first sector gear 31, and of the second gear 72 and the second sector gear 51 respectively, that is a different height from the deck. Thus, though pressure is applied to only one side of the housing 80, both right and left sides thereof can be assembled so that they are loaded simultaneously. In this case, the right and left sides of the housing 80 are necessarily deformed at loaded position to compensate for the difference between the interlocking locations of the gears installed on the right and left side of the housing 80.

As described above, in order to securely load the tape cassette 200, the conventional housing assembly 100 requires deformation of the right and left sides of the housing 80 to compensate for the difference between the interlocking locations of the gears installed on the both sides thereof. This results in a complex assembling operation.

SUMMARY OF THE INVENTION

It is an object of the present invention to provide a cassette housing assembly of a tape recorder capable of securely loading a tape cassette without deforming the housing.

To accomplish the above object, a cassette housing assembly of a tape recorder according to the present invention comprises a housing, for receiving a tape cassette, supported by a deck member to ascend and descend during operation, a plurality of arm members installed on both sides of the housing for supporting the housing with respect to the deck member, a shaft installed across both sides of the housing, first and second gears respectively coupled to both ends of the shaft, first and second sector gears coupled to both ends of the arm members on both sides of the housing and meshed with the first and second gears, respectively, and locking means installed on one side of the housing, for locking the housing on the deck member. The radius of the first gear is smaller than that of the second gear and thus both sides of the housing rotate at an equal rotating angle when the housing is rotated by pressing a specified point on the outer surface of the housing that corresponds to the locking means. It is preferable that the radius of the first sector gear is larger than that of the second sector gear.

According to the characteristics of the present invention, since the radius of the first gear is smaller than that of the second gear, a difference in rotating angles of right and left sides of the housing is effected. Accordingly, if one side of a specified point on the outer surface of the housing equipped with a locking means is pressed in order to rotate the housing, a rotating angle of the other side of the housing having no locking means, and thus to which no pressure is applied, becomes relatively large and both right and left sides of the housing are securely placed in a loaded position at the same time. Therefore, a housing assembly of a tape recorder according to the present invention enables a tape cassette to be securely loaded without deforming the housing.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

Figure 1:
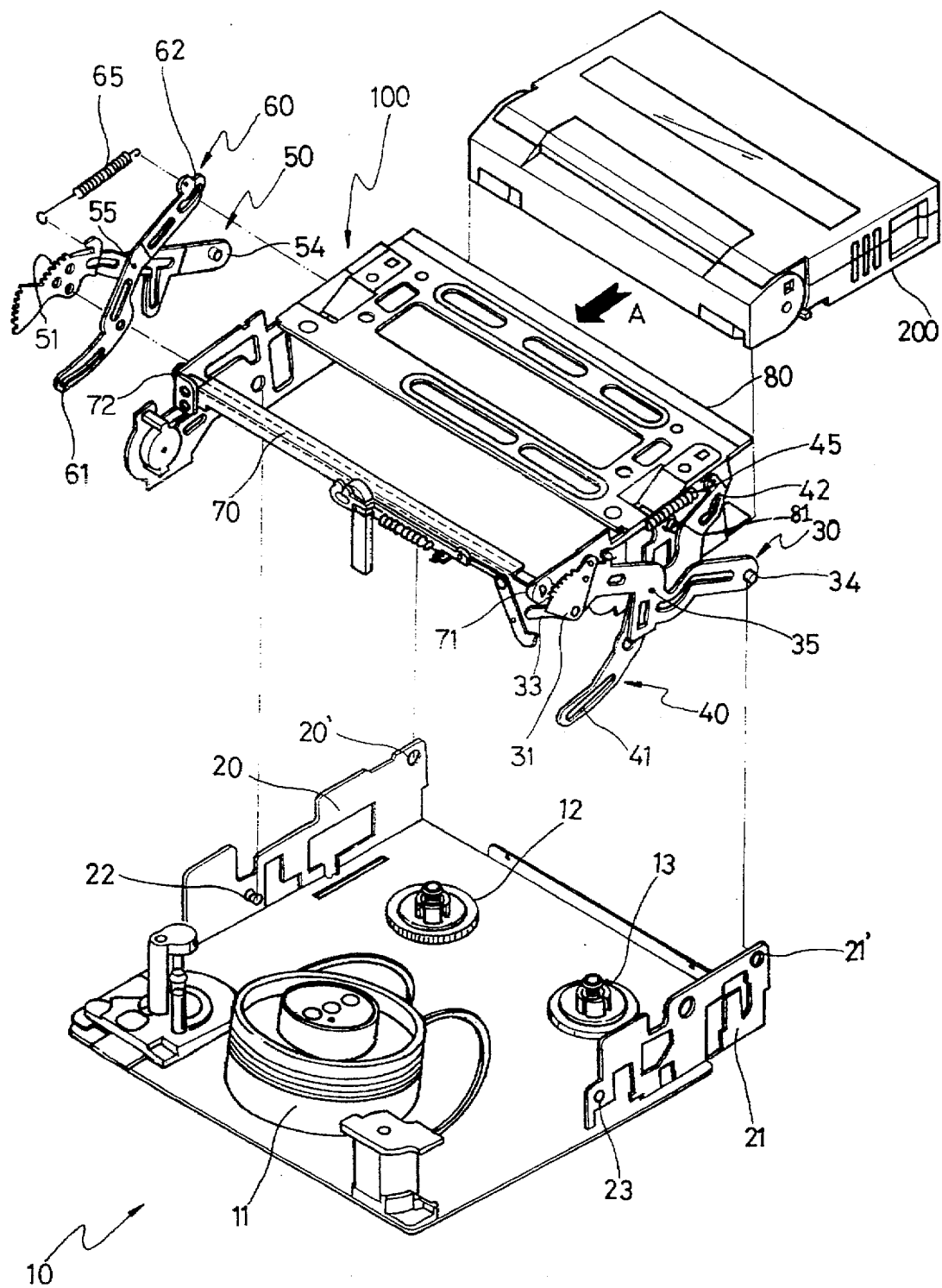
FIG. 1 is a perspective view of conventional housing assembly of a tape recorder.
Figure 2A:
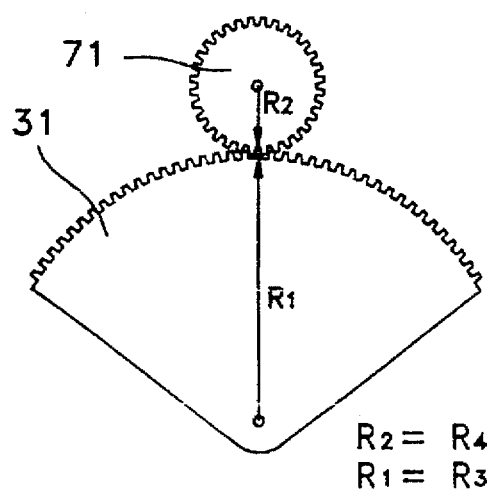
FIGS. 2A and 2B are schematic views illustrating gear portions of a conventional housing assembly.
Figure 2B:
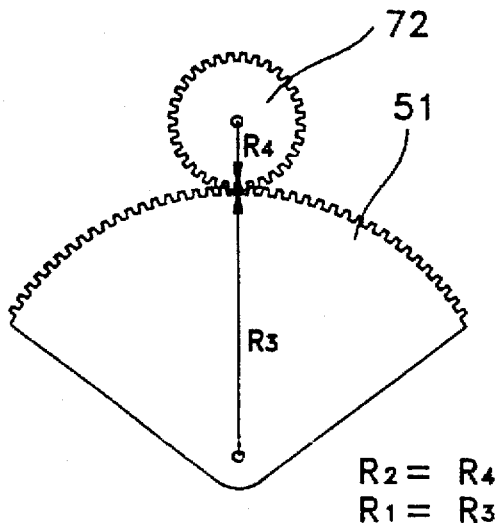
Figure 3A:
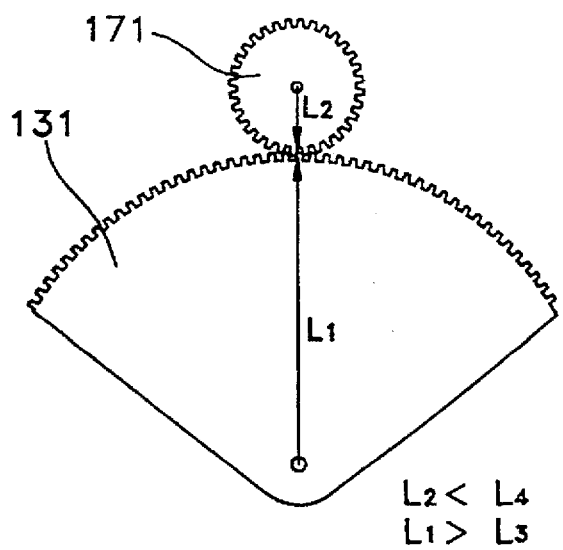
FIGS. 3A and 3B are schematic views illustrating gear portions of a housing assembly according to the preferred embodiment.
Figure 3B:
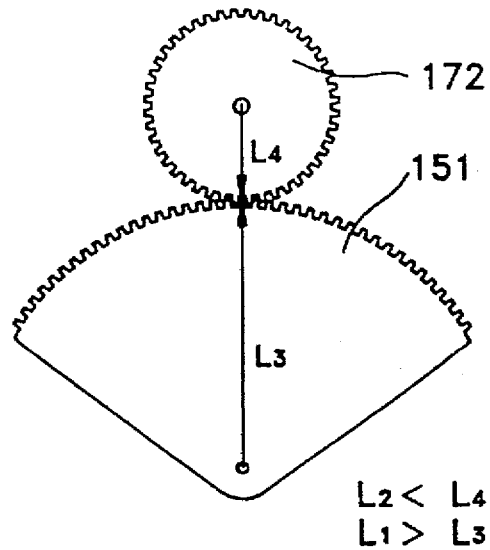
Figure 4:
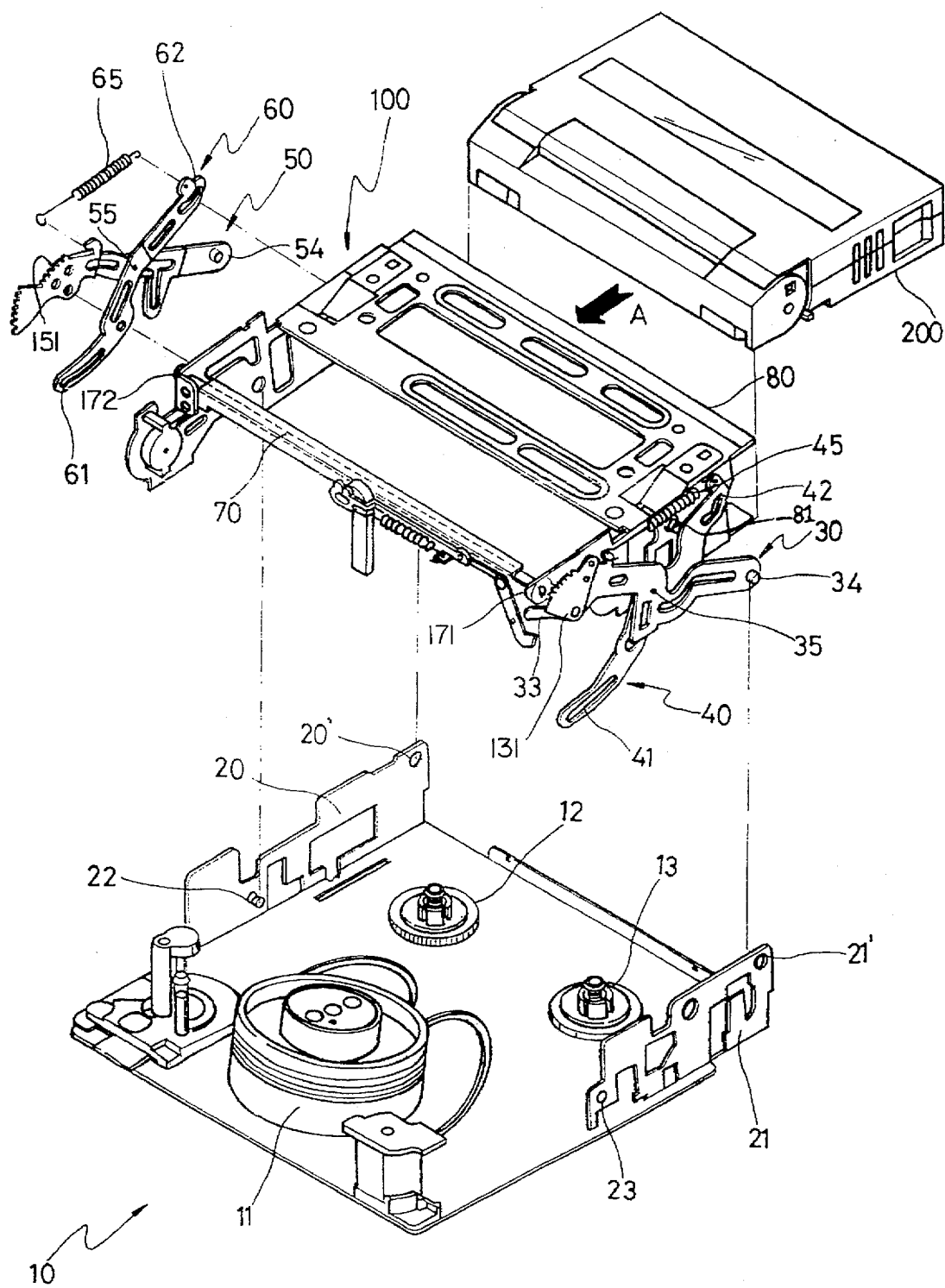
FIG. 4 is a perspective view of a housing assembly of the preferred embodiment.

As illustrated in FIG. 4, a housing assembly 100 of a tape recorder according to the preferred embodiment includes all the primary elements of the conventional housing assembly which are labeled with like reference numerals and not described further. However, besides the elements described previously and in lieu of the gears 71 & 72 and 31 & 51, the device of the present invention is characteristically provided with a phase difference corrector (see FIGS. 3A and 3B) comprised of first and second gears 171 and 172 respectively coupled to the ends of the shaft 70, and first and second sector gears 131 and 151 which are meshed with the first and second gears 171 and 172 and installed on each end of the first and third arm members 30 and 50, respectively.

The phase difference corrector enables both sides of the housing 80 to rotate at an equal rotating angle when the housing 80 rotates by pressure applied to a specified point on the outer surface of the housing 80 corresponding to the locking structure. Radius $L_2$ of the first gear 171 is smaller than radius $L_4$ of the second gear 172, and radius $L_1$ of the first sector gear 131 is formed larger than radius $L_3$ of the second sector gear 151. Of course, the above-mentioned radii are measured from a rotational axis.

The operation of the housing assembly 100 having the above structure is described below. After the tape cassette 200 is loaded into the housing 80, a force is manually applied to a specified point on the outer surface of the housing 80 corresponding to the locking pin 81, so that the locking pin 81 is locked on the lock (not shown) and the cassette is seated on the reel tables 12 and 13.

If a specified point on the outer surface of one side of the housing 80 having the above locking structure is pressed, the housing 80 descends via the rotation of the first to fourth arm members 30, 40, 50 and 60 centered on the pins 35 and 55. At this time, the spring members 45 and 65 are placed under tension.

Since the radius of the first gear 171 located on a side corresponding to the pressed portion of the housing 80 is smaller than that of the second gear 172, and the gears rotate at the same angular velocity because they are mounted on a common shaft, the tangental rotation amount of the second gear 172 becomes larger than that of the first gear 171. Also, since the radius of the first sector gear 131 in engagement with the first gear 171 is larger than that of the second sector gear 151, the angular rotation amount of the second sector gear 151 is slightly larger than that of the first sector gear 131 and thus the third and fourth arm members 50 and 60 rotate faster than the first and second arc members 30 and 40.

Upon locking the housing 80 on the deck member 10, a specified point, i.e., pin 81 on the outer surface of one side of the housing 80 equipped with the locking structure is pressed. Accordingly, even though the radius of the first gear 171 of the side at which the locking structure is installed is less than that of the second gear 172, one side of the housing 80 on which the first gear 171 is installed tends to be pressed down by the force applied to the housing 80, so that both sides of the housing rotate by the same amount.

As described above, the housing assembly of a tape recorder according to the present invention has the following advantages. To load both sides of a housing simultaneously, both sides thereof must have force applied thereto on the chassis 20 and 21, in the conventional device. However, in the housing assembly according to the present invention, even loading is achieved by establishing a difference of the radii of the gear members installed on the right and left sides of the housing.

As described hereinabove, the present invention provides a housing assembly of a tape recorder having a simple construction. The invention has been described through a preferred embodiment. However, various modifications can be made without departing from the scope of the invention.

What is claimed is:

1. A housing assembly of a tape recorder, comprising:

a housing for receiving a tape cassette, said housing being supported by a deck member while ascending and descending during operation, said housing including an outer surface and two sides;

at least one arm member installed on each of said two sides of said housing for supporting said housing with respect to said deck member;

a shaft extending across said housing;

first and second gears respectively coupled to both ends of said shaft;

first and second sector gears respectively coupled to ends of said arm members and being meshed with said first and second gears, respectively; and locking means installed on one of said two sides of said housing, for selectively locking said housing at a loaded position on said deck member, wherein the radius of said first gear is smaller than that of said second gear, thereby to cause said two sides of said housing to rotate at an equal rotating angle when said housing is rotated by pressing a specified point on one side of the outer surface of said housing.

2. A housing assembly as claimed in claim 1, wherein said locking means is located on the one side of the outer surface of said housing and said specified point comprises a portion of said locking means.

3. A housing assembly as claimed in claim 2, wherein the radius of said first sector gear is larger than that of said second sector gear.

4. A housing assembly as claimed in claim 3, wherein there are two of said arms on each side of said housing, with one arm on each side being coupled with a corresponding one of said first and second sector gears.

5. A housing assembly as claimed in claim 4, further comprising:

means for biasing said housing toward an unloaded position.

* * * * *